United States Patent [19]

McGirk

[11] 4,264,761
[45] Apr. 28, 1981

[54] COPOLYESTER BARRIER COAT

[75] Inventor: Richard H. McGirk, Beaumont, Tex.

[73] Assignee: E. I. Du Pont de Nemours and Company, Wilmington, Del.

[21] Appl. No.: 128,177

[22] Filed: Mar. 7, 1980

[51] Int. Cl.$^3$ .............................................. C08G 63/66
[52] U.S. Cl. .................... 528/300; 260/22 D; 428/480; 528/301; 528/302
[58] Field of Search ............... 528/300, 301, 302; 260/22 D

[56] References Cited

U.S. PATENT DOCUMENTS

| | | | |
|---|---|---|---|
| 2,347,562 | 4/1944 | Johnston | 568/816 |
| 3,235,520 | 2/1966 | Crowell | 260/22 |
| 3,423,281 | 1/1969 | Wiener | 428/473 |
| 3,763,109 | 10/1973 | Witsiepe | 528/301 |
| 3,954,689 | 5/1976 | Hoeschele | 260/22 D |

*Primary Examiner*—Lucille M. Phynes

[57] ABSTRACT

An elastomeric copolyester having a multiplicity of recurring intralinear long chain and short chain ester units connected through ester linkages wherein:

(A) about 75–96 weight percent of said short chain ester units are represented by the following formula

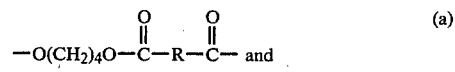

(B) about 4–25 weight percent of said long chain ester units are selected from units represented by the following formulas

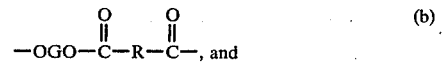

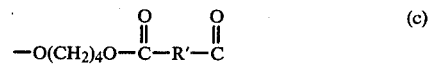

wherein G is a divalent radical remaining after removal of hydroxyl groups from a poly(alkylene oxide) glycol having a number average molecular weight of about 400–1100 and a carbon-to-oxygen atomic ratio of 3–4, R is a divalent radical remaining after removal of carboxyl groups from dicarboxylic acids which are provided as a mixture comprising:
(1) about 50–90 weight percent terephthalic acid,
(2) about 5–25 weight percent of at least one hexacarbocyclic dicarboxylic acid in which the carboxyl groups are attached to the hexacarbocyclic nucleus in a 1,2- or 1,3-relationship
(3) about 5–25 weight percent of at least one aliphatic dicarboxylic acid containing 6 to 12 carbon atoms and having at least 4 carbon atoms between carboxyl groups, and R' is a divalent radical remaining after the removal of carboxyl groups from dimer acid.

9 Claims, No Drawings

COPOLYESTER BARRIER COAT

BACKGROUND OF THE INVENTION

Users of plastics and elastomers generally have a wide range of polymer compositions from which to select to optimize product cost and performance. There are instances, however, where problems such as staining or plasticizer migration drastically reduce the number of options available. Plasticized polyvinyl chloride compositions are a well-known illustration of materials subject to such problems. Plasticized polyvinyl chloride (PVC) coatings are stained by many substances including cigarette smoke and cosmetics. When used in a confined space or in contact with other polymeric materials, the plasticizers in many polyvinyl chloride compositions may migrate or volatilize to cause a variety of problems. Barrier coatings or top coatings of other polymers have been used in an effort to overcome problems of the type just described for plasticized polyvinyl chloride. A number of copolyesters have been found useful as barrier coatings; however, they are far too stiff for use in situations where flexibility of the substrate is important.

A number of copolyetheresters have also been considered as barrier coatings but in general were found to be either too stiff for use with flexible substrates or lacking in barrier properties. The present invention is related to novel elastomeric copolyesters which are stain-resistant and relatively impervious toward plasticizers. They form top coats that are tough, adherent, transparent and flexible. The balance of properties that they possess provides advantages over conventional copolyesters or copolyetheresters.

SUMMARY OF THE INVENTION

The present invention is directed to an elastomeric copolyester having a multiplicity of recurring intralinear long chain and short chain ester units connected through ester linkages wherein:

(A) about 75–96 weight percent of said short chain ester units are represented by the following formula

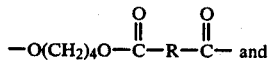 (a)

(B) about 4–25 weight percent of said long chain ester units are selected from units represented by the following formulas

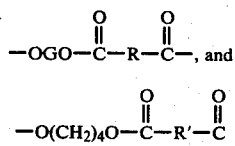

wherein
G is a divalent radical remaining after removal of hydroxyl groups from a poly(alkylene oxide) glycol having a number average molecular weight of about 400–1100 and a carbon-to-oxygen atom ratio of 3–4,
R is a divalent radical remaining after removal of carboxyl groups from dicarboxylic acids which are provided as a mixture comprising:
(1) about 50–90 weight percent terephthalic acid,
(2) about 5–25 weight percent of at least one hexacarbocyclic dicarboxylic acid in which the carboxyl groups are attached to the hexacarbocyclic nucleus in a 1,2- or 1,3-relationship.
(3) about 5–25 weight percent of at least one aliphatic dicarboxylic acid containing 6 to 12 carbon atoms and having at least 4 carbon atoms between carboxyl groups, and
R' is a divalent radical remaining after the removal of carboxyl groups from dimer acid.

Preferably, the hexacarbocyclic dicarboxylic acid contains 8–12 carbon atoms and, most preferably, is isophthalic acid. The copolyesters are useful as barrier coatings or top coatings on a variety of flexible polymeric substrates, such as plasticized polyvinyl chloride, to prevent staining of the substrate and to minimize migration of the plasticizer.

DESCRIPTION OF PREFERRED EMBODIMENTS

With reference to the copolyesters of this invention, the term "long chain ester units" refers to reaction products of long chain glycols with mixtures of dicarboxylic acids to be described in detail hereinafter and/or to the reaction product of dimer acid and 1,4-butanediol. These long chain ester units correspond to aforementioned formulas (b) and (c), respectively. The long chain glycols which provide G in formula (b) are poly(alkylene oxide) glycols having number average molecular weights of 400–1100 and carbon-to-oxygen atom ratio of about 3 to 4. Representative long chain glycols include poly(1,2-propylene oxide) glycol, poly(tetramethylene oxide) glycol and random or block copolymers of tetrahydrofuran with ethylene oxide or propylene oxide. The mixture of dicarboxylic acids which are represented by R in formula (b) will be described in detail hereinbelow in discussing the short chain ester units.

The term "long chain ester units" also applies to units which are the reaction product of dimer acid having a molecular weight of about 565 with 1,4 butanediol. Such "long chain ester units", which can be a repeating unit in certain of the copolyesters of this invention, correspond to the formula (c) above. Dimer acid is the dimerization product of unsaturated $C_{18}$ fatty acids such as linoleic and linolenic acid or esters thereof. The preparation and structure of the dimerized fatty acid is described in J.Am.Chem.Soc. 66,84 (1944) and in U.S. Pat. No. 2,347,562, both of which are herein incorporated by reference. Several grades of dimer acids which vary in the degree of unsaturation and monomer and trimer content are available from commercial sources. The preferred dimer acid compositions are substantially free of monomer and trimer fractions and are fully saturated. A high quality grade of dimer acid meeting these requirements is commercially available under the trade name "Empol" 1010 from Emery Industries, Inc. Lower grades of dimer acid containing a low level of unsaturation and trimer—as represented by "Empol" 1014—are also suitable for the preparation of the copolyesters of this invention. In this case it is advantageous to compensate for the trimer content of the dimer acid—which should not exceed 15% by weight—by using an equivalent amount of monofunctional fatty acid or long chain alcohol as a polymerization modifier to prevent the formation of highly branched or cross-linked polymers. Representative monofunctional fatty acids are stearic and palmitic acid; long chain alcohols include lauryl and octadecyl alcohol. Principally, any monofunctional carboxylic acid or alcohol can be used in melt condensation polymerizations as long as its vapor pressure is substantially lower than that of the particular low molecular glycol employed.

The short chain ester units represented by formula (a) above are derived from 1,4-butanediol and a mixture of at least three dicarboxylic acids in the proportions indicated hereinbefore. The mixture of acids must contain terephthalic acid. In addition, a hexacarbocyclic dicarboxylic acid in which the carbonyl groups are attached to the carbocyclic nucleus in a 1,2- or 1,3-relationship must also be present. The 6-membered carbon ring in these acids may be aromatic, partially saturated or fully saturated. Representative acids include isophthalic and phthalic acids, 1,2- and 1,3-cyclohexanedicarboxylic acids, 4-methyl-1,2-cyclohexanedicarboxylic acid, 3-methylphthalic acid, 1,2,3,6-tetrahydrophthalic acid and 3,6-endomethylene-1,2,3,6-tetrahydrophthalic acid. These acids usually contain between 8–12 carbon atoms. Preferred acids are isophthalic, phthalic and hexahydrophthalic acids with isophthalic being especially preferred. Finally, at least one aliphatic dicarboxylic acid with at least 4 carbon atoms between carboxyl groups must be present. Representative aliphatic dicarboxylic acids include adipic, azeleic, pimelic, suberic, tetramethyl adipic and 1,12-dodecanedicarboxylic acid. The 1,12-dodecanedicarboxylic acid is especially preferred. It is to be understood that any of the acids described above may be used in the form of ester-forming equivalents such as their lower alkyl esters or as their anhydrides. The properties of the three types of acids to be used should however be calculated on a weight basis for the acids themselves.

The preferred amounts of the three acids in the mixture of dicarboxylic acids are as follows, 60–80 weight percent terephthalic acid, 12–22 weight percent of the hexacarbocyclic dicarboxylic acid and 7–18 weight percent of the aliphatic dicarboxylic acid. A preferred mixture of acids is terephthalic acid, isophthalic acid and 1,12-dodecanedicarboxylic acid and especially in the preferred amounts given above.

As previously indicated, the amount of short chain ester units in the copolyesters of this invention should be about 75–96% by weight. The preferred amount of short chain ester units is about 83–95% by weight.

The polymers described herein can be made conveniently by a conventional ester interchange reaction. A preferred procedure involves heating the mixture of acids or their methyl esters, a poly(alkylene oxide) glycol and/or dimer acid and a molar excess of 1,4-butanediol in the presence of a catalyst at 150° to 260° C. Heating is continued until methanol and/or water evolution is substantially complete. Depending on temperature, catalyst and glycol excess, this polymerization is complete within a few minutes to a few hours. This procedure results in the preparation of a low molecular weight prepolymer which can be carried to a high molecular weight copolyester of this invention by the procedure described below.

The resulting prepolymer is then carried to high molecular weight by distillation of the excess of short chain diol. This process is known as "polycondensation". Additional ester interchange occurs during this distillation to increase the molecular weight and to randomize the arrangement of the copolyester units. Best results are usually obtained if this final distillation or polycondensation is run at a pressure less than 130 Pa and 240°–260° C. for less than 2 hours in the presence of antioxidants.

Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess good resistance toward heat aging and photodegradation, it is advisable to stabilize these compositions by incorporating antioxidants in the copolyester compositions.

Preferred phenolic antioxidants useful as stabilizers include 1,3,5-tris(3,5-di-tert-butyl-4-hydroxyhydrocinnamoyl)-hexahydro-s-triazine, 1,3,5-trimethyl-2,4,6-tris(3,5-di-tert-butyl-4-hydroxybenzyl)benzene, tetrakis[methylene(3,5-di-tert-butyl-4-hydroxyhydrocinnamate)]methane, N,N'-hexamethylene bis (3,5-di-tert-butyl-4-hydroxyhydrocinnamamide) and N,N'-trimethylene bis(3,5-di-tert-butyl-4-hydroxyhydrocinnamamide). Increased resistance to photodegradation can be achieved by adding hindered amine stabilizers such as bis(1,2,2,6,6-penta-methyl-4-piperidinyl) n-butyl(3,5-di-tert-butyl-4-hydroxybenzyl)malonate and bis(1,2,2,6,6-penta-methyl-4-piperidinyl) bis(3,5-di-tert-butyl-4-hydroxybenzyl)malonate.

The copolyesters of this invention are useful as barrier coatings or top coatings on a variety of flexible polymeric substrates. As previously indicated, an important substrate is plasticized polyvinyl chloride. As a coating on plasticized polyvinyl chloride, the copolyester prevents staining of the substrate by substances such as smoke, lipstick and ink, soiling in general and eliminates or minimizes the migration of the plasticizer in the substrate. At the same time, the flexibility of the substrate is substantially retained because of the high flexibility of the copolyesters of this invention. Other representative substrates where the copolyesters are useful include plasticized vinylidene chloride polymers, soft or plasticized superpolyamides, urethane elastomers and even soft copolyetheresters having a high proportion of long chain ester units. In those instances where no plasticizer is present, the copolyesters of this invention still provide protection against staining and soiling.

The coated articles can be formed by a variety of techniques including coextrusion, coating an already formed substrate in a cross-head extruder, laminating and compression molding. In some instances it may be convenient to use the copolyesters in the form of a solution coating by dissolving the copolyester in one or more halogenated solvents such as methylene chloride, chloroform and 1,1,2-trichloroethylene. Particularly useful specific coated articles include coated PVC wire, coated PVC refrigerator gaskets and coated PVC sheet. The thickness of the coating employed usually is between 0.02 and 0.2 mm.

The following examples illustrate the invention. All parts are by weight unless otherwise indicated.

EXAMPLES

The following ASTM methods are employed in determining the properties of the polymers prepared in the examples which follow:
Hardness, Shore D—D1484
Clash-Berg Torsional Stiffness—D1043
Flexural Modulus—D797
Brittle Temperature—D746
Young's Modulus—E111

The modulus at 5% strain and Young's modulus are measured on 6.35 mm×152 mm×1.27 mm samples with a cross-head speed 25.4 mm/min.

Melt index is determined at 190° C. or 200° C. with a 2160 g weight.

Polymer melting points are determined by means of a differential scanning calorimeter.

Volume swell in tricresyl phosphate is measured after heating the samples for 20 minutes at 120° C. followed by 12 days at 22° C. unless otherwise specified.

EXAMPLE 1

Copolyester A is prepared by placing the following materials in a 100 gallon stainless steel, oil-heated still:

| | |
|---|---|
| Dimethyl terephthalate | 27.3 kg |
| Dimethyl isophthalate | 6.8 kg |
| 1,4-Butanediol | 28.6 kg |
| 1,12-Dodecanedicarboxylic acid | 4.4 kg |
| Polytetramethylene ether glycol (number average MW about 650) | 4.4 kg |
| Tetrabutyl titanate | 93.1 g |
| Antioxidant A[a] | 93.1 g |

[a]N,N'-hexamethylene bis(3,5-di-tert-butyl-4-hydroxy-hydrocinnamide)

The air in the still is replaced with nitrogen, and the still is heated to 180° C. During this period, the reaction mixture liquifies, and methanol begins distilling over. When 8.4 kg of methanol (75% of theoretical) is collected, the reaction liquid is transferred to a jacketed, 200 gallon autoclave equipped with a helical agitator. The polymerization mass is stirred at 15 rpm and is heated to 220° C. Also the pressure is reduced in stages over a ¾ to 1½ hour period until full vacuum is achieved (0.2-0.7 kPa). Then the temperature is increased to 255±5° C., and the agitator speed is also increased to 30 rpm. After 1 to 3 hours the stirrer voltage begins increasing. When the polymerization mass reaches the desired viscosity, the agitator is stopped, the autoclave pressured with 0.5 MPa nitrogen, and the polymerization mass extruded as a flat ribbon and quenched in a water trough (extrusion takes about 30 minutes). Samples for physical testing are prepared by compression-molding dried, shredded polymer at 200° C. for one minute and cooling rapidly in the press.

The monomers used provide the equivalent of a mixture of dicarboxylic acids containing 69.6 weight % terephthalic acid, 17.3 weight % isophthalic acid and 13.1 weight % dodecanedicarboxylic acid. Copolyester A contains 89 weight % short chain ester units.

Two control polymers containing no dodecanedicarboxylic acid are prepared by the same procedure from the following materials:

| | Control-1 | Control-2 |
|---|---|---|
| Dimethyl terephthalate | 36.6 kg | 41.8 kg |
| Dimethyl isophthalate | 15.7 kg | 10.5 kg |
| 1,4-Butanediol | 34.9 kg | 34.9 kg |
| Polytetramethylene ether glycol (number average MW about 1000) | 11.0 kg | 11.0 kg |
| Tetrabutyl titanate | 70 g | 70 g |
| Antioxidant A | 140 g | 140 g |
| Photostabilizer A[b] | 356 g | 350 g |

[b]bis(1,2,2,6,6-pentamethyl-4-piperidinyl) n-butyl(3,5-di-tert-butyl-4-hydroxybenzyl)malonate;

Properties of copolyester A and Controls 1 and 2 are shown in Table I.

TABLE I

| Polymer | A | Control 1 | Control 2 |
|---|---|---|---|
| Melt Index | | | |
| at 190° C., g/10 min | 48 | 50 | No Flow |
| 200° C., g/10 min | — | — | 50 |
| DSC mp (°C.) | 174 | 166 | 186 |
| Shore D Hardness | 58 | 58 | 62 |
| M$_5$ (MPa) | 7.9 | 7.6 | 12.6 |
| Young's Modulus (MPa) | 223 | 207 | 337 |
| Flexural Modulus (MPa)* | 212 | 176 | 280 |
| Torsional Modulus | | | |
| 22° C. (MPa) | 85 | 67 | 127 |
| −10° C. | 350 | 320 | 371 |
| −20° C. | 509 | 432 | 468 |
| % Vol. Swell in Tricresyl Phosphate (12 days) | 3.6 | 5.6 | 3.0 |
| Brittle Point, °C.* | −60 | −60 | −60 |

*Injection molded samples

Humidity aging of Polymer A and Control 2 at 60°-70° C. and 90-100% relative humidity shows no change in M$_{20}$ after six weeks.

The copolyester of this invention exhibits a better combination of flexibility, solvent resistance, and melting point than the controls. The extent of swelling in tricresyl phosphate is related to the tendency toward staining. In actual staining tests using lipstick, a blue ball point pen and a felt tip marker (MARKS-A-LOT®), Polymer A was found to be equivalent to Control 2 and superior to Control 1.

EXAMPLE 2

Two copolyesters ae prepared with the same monomer composition as Polymer A with the exception that the following stabilizers are used:
Antioxidant A—71.3 g
Antioxidant B[c]—71.3 g
Photostabilizer A—235 g

[c]N,N'-trimethylene bis(3,5-di-tert-butyl-4-hydroxy-hydrocinnamamide)

The polymerization procedure is the same as Polymer A except that the polymerization is stopped sooner as shown by higher melt indexes.

Properties of Polymers A, B and C are shown in Table II.

TABLE II

| Polymer | A | B | C |
|---|---|---|---|
| Melt Index, 190° C., g/10 min | 48 | 113 | 78 |
| DSC, m.p. (°C.) | 173 | 173 | 173 |

TABLE II-continued

| Polymer | A | B | C |
|---|---|---|---|
| $M_5$ (MPa) | 8.1 | 8.9 | 8.6 |
| Flexural Modulus (MPa)* | 195 | 208 | 202 |
| % Vol. Swell in Tricresyl Phosphate | 2.5 | 3.2 | 2.5 |

*Injection molded

Copolyesters A, B and C have the same composition, but differ in molecular weight as shown by melt index. Copolyester B has the highest melt index and while it shows a modest increase in volume swell it is still useful as a barrier coating.

EXAMPLE 3

Copolyester A-3 is prepared by placing the following materials in a 400 ml reaction kettle fitted for distillation:

| | |
|---|---|
| Dimethyl terephthalate | 40.4 g |
| Dimethyl isophthalate | 10.1 g |
| 1,4-Butanediol | 42.4 g |
| Polytetramethylene ether glycol (number average MW about 650) | 6.5 g |
| 1,12-Dodecanedicarboxylic acid | 6.5 g |
| Antioxidant A | 0.14 g |
| Catalyst Solution | 2.8 g |

The proportions of the monomers used is the same as used in the preparation of Copolyester A in Example 1.

A stainless steel stirrer with a paddle cut to conform with the internal radius of the flask bottom and with a circular baffle 1.27 cm less in diameter than the inside of the flask is positioned with the paddle at the bottom of the flask and the baffle about 6.35 cm above the bottom of the flask. Air in the flask is replaced with nitrogen. The flask is placed in an oil bath heated to a temperature of about 160° C. After the reaction mixture liquifies, agitation is begun, and the oil bath temperature is raised to 220° C. Methanol distills from the reaction mixture for a 30 minute period. The oil bath temperature is increased to 255° C.±5° C., and the pressure gradually reduced to 0.2-0.27 kPa over a period of about 40 minutes. The polymerization mass is stirred until the desired viscosity is reached. This usually takes 1-1½ hours. The resulting viscous molten product is scraped from the flask in a nitrogen atmosphere and allowed to cool.

The catalyst solution in this example and subsequent examples is prepared by stirring 5 g of tetrabutyl titanate into 95 g of 1,4-butanediol at room temperature.

The properties of the copolyester A-3 prepared in this manner are shown in Table III.

EXAMPLE 4

Copolyester D is prepared substantially by the procedure of Example 3 except that 6.5 g of polytetramethylene ether glycol (number average MW about 1,000) is substituted for polytetramethylene ether glycol (650 MW).

Physical properties of D are shown in Table III.

EXAMPLE 5

Copolyesters E and F are prepared from the following ingredients substantially by the procedure of Example 3.

| | E | F |
|---|---|---|
| Dimethyl terephthalate | 40.4 g | 40.4 g |
| Dimethyl isophthalate | 10.1 g | 10.1 g |
| 1,4-Butanediol | 42.4 g | 42.4 g |
| Polytetramethylene ether glycol (number average MW about 650) | 4.5 g | 8.0 g |
| 1,12-Dodecanedicarboxylic acid | 7.5 g | 5.0 g |
| Antioxidant A | 0.14 g | 0.14 g |
| Catalyst Solution | 2.8 g | 2.8 g |

The monomers used for Copolyester E provide the equivalent of a mixture of acids containing 68.2 weight % terephthalic acid, 17.0 weight % isophthalic acid and 14.8 weight % dodecanedicarboxylic acid. For Copolyester F, these figures are 71.7, 17.9 and 10.4 weight % respectively. Copolyester E contains 92 weight % short chain ester units; Copolyester F, 86 weight % short chain ester units.

Properties of Copolyesters A-3, D, E, and F are shown in Table III. Samples for testing are prepared by compression molding at 200° C.

TABLE III

| Polymer | A-3 | D | E | F |
|---|---|---|---|---|
| Melt Index at 190° C., g/10 min | 20 | 13 | 17 | 17 |
| DSC, m.p. (°C.) | 180 | 175 | 172 | 176 |
| $M_5$ (MPa) | 7.6 | 7.6 | 8.1 | 7.9 |
| $M_{100}$ (MPa)* | 14.8 | 14.8 | 14.5 | 14.5 |
| $T_B$ (MPa)* | 29.7 | 40.7 | 36.5 | 28.3 |
| $E_B$, % | 540 | 585 | 575 | 515 |
| Torsional Stiffness | | | | |
| 22° C. (MPa) | 69 | 62 | 79 | 76 |
| −10° C. | 354 | 296 | 406 | 262 |
| −20° C. | 517 | 489 | 579 | 406 |
| % Vol. Swell in Tricresyl Phosphate (7 days at 65° C.) | 16.6 | 16.7 | 16.2 | 17.4 |

*ASTM Method D412, crosshead speed 5.08 cm/minute.

Copolyesters A-3, D, E and F are all useful as barrier coatings. The relatively high volume swells are the result of running the test at 65° C. Copolyester A, prepared in Example 1, has the same chemical composition as Copolyester A-3 and has a volume swell of 3.6% at 22° C.

EXAMPLE 6

Copolyesters G and H are prepared from the following ingredients substantially by the procedure of Example 3.

| | G | H |
|---|---|---|
| Dimethyl Terephthalate | 34.4 g | 40.4 g |
| Dimethyl Isophthalate | 8.6 g | 10.1 g |
| 1,4-Butanediol | 39.0 g | 45.0 g |
| Dimer Acid (Empol 1010) | 14.9 g | 10.0 g |
| 1,12-Dodecanedicarboxylic acid | — | 6.5 g |
| Antioxidant A | 0.12 g | 0.14 g |
| Catalyst Solution | 2.6 g | 2.8 g |

Copolyester G is a prior art control which does not contain a $C_6$ to $C_{12}$ aliphatic dicarboxylic acid. Copolyester H contains 86 weight % short chain ester units. The monomers used for Copolyester H provide the equivalent of a mixture of dicarboxylic acids containing 69.5 weight % terephthalic acid, 17.4 weight % isophthalic acid and 13.1 weight % dodecanedicarboxylic acid.

Properties of copolyesters G and H are shown in Table IV.

TABLE IV

| | G | H |
|---|---|---|
| DSC, m.p. (°C.) | 173 | 167 |
| $M_5$ (MPa) | 6.6 | 6.9 |
| Young's Modulus (MPa) | 166 | 172 |
| Torsional Modulus (MPa) | | |
| 22° C. | 50 | 63 |
| −10° C. | 254 | 247 |
| −20° C. | 428 | 475 |
| % Volume Swell in Tricresyl Phosphate | | |
| (7 days, 22° C. + 20 min./125° C.[d]) | 5.4 | — |
| (11 days, 22° C., + 20 min./125° C.[e]) | — | 3.0 |

[d]0.78 mm thickness
[e]1.3 mm thickness

Prior art Copolyester G exhibits a higher volume swell than does Copolyester H of this invention.

I claim:

1. An elastomeric copolyester having a multiplicity of recurring intralinear long chain and short chain ester units connected through ester linkages wherein:
   (A) about 75-96 weight percent of said short chain ester units are represented by the following formula

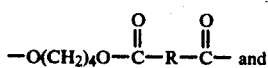  (a)

and
   (B) about 4-25 weight percent of said long chain ester units are selected from units represented by the following formulas

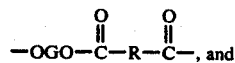, and  (b)

  (c)

wherein
   G is a divalent radical remaining after removal of hydroxyl groups from a poly(alkylene oxide) glycol having a number average molecular weight of about 400-1100 and a carbon-to-oxygen atom ratio of 3-4,
   R is a divalent radical remaining after removal of carboxyl groups from dicarboxylic acids which are provided as a mixture comprising:
   (1) about 50-90 weight percent terephthalic acid,
   (2) about 5-25 weight percent of at least one hexacarbocyclic dicarboxylic acid in which the carboxyl groups are attached to the hexacarbocyclic nucleus in a 1,2- or 1,3-relationship,
   (3) about 5-25 weight percent of at least one aliphatic dicarboxylic acid containing 6 to 12 carbon atoms and having at least 4 carbon atoms between carboxyl groups, and
   R' is a divalent radical remaining after the removal of carboxyl groups from dimer acid.

2. A copolyester of claim 1 wherein the long chain ester units are represented by the structure

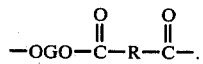.

3. A copolyester of claim 1 wherein the long chain ester units are represented by the structure

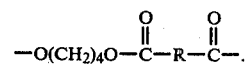.

4. A copolyester of claim 1 having 83-95 weight percent short chain ester units.

5. A copolyester of claim 1 wherein the mixture of dicarboxylic comprise
   (1) about 60-80 weight percent terephthalic acid,
   (2) about 12-22 weight percent of at least one hexacarbocyclic dicarboxylic acid having 8-12 carbon atoms,
   (3) about 7-18 weight percent of at least one aliphatic dicarboxylic acid containing 6-12 carbon atoms and having at least 4 carbon atoms between carboxyl groups.

6. A copolyester of claim 1 wherein the dicarboxylic acid mixture is terephthalic acid, isophthalic acid and dodecanedicarboxylic acid.

7. A copolyester composition of claim 1 wherein G in the above formula is derived from poly(tetramethylene oxide) glycol.

8. As an article of manufacture a flexible polymer substrate coated with the copolyester elastomer of claim 1.

9. An article of claim 8 wherein the flexible polymer is plasticized polyvinyl chloride.

* * * * *